No. 645,640. Patented Mar. 20, 1900.
R. N. CHAMBERLAIN.
STORAGE BATTERY CELL.
(Application filed Aug. 25, 1899.)
(No Model.)

Witnesses:
Henry L. Deck.
E. A. Volk

R. N. Chamberlain Inventor.
By Wilhelm Bonner Attorneys

THE NORRIS PETERS CO., PHOTO-LITHO., WASHINGTON, D. C.

UNITED STATES PATENT OFFICE.

RUFUS N. CHAMBERLAIN, OF DEPEW, NEW YORK, ASSIGNOR TO CHARLES A. GOULD, OF PORT CHESTER, NEW YORK.

STORAGE-BATTERY CELL.

SPECIFICATION forming part of Letters Patent No. 645,640, dated March 20, 1900.

Application filed August 25, 1899. Serial No. 728,487. (No model.)

*To all whom it may concern:*

Be it known that I, RUFUS N. CHAMBERLAIN, a citizen of the United States, residing at Depew, in the county of Erie and State of New York, have invented new and useful Improvements in Storage-Battery Cells, of which the following is a specification.

This invention relates to that class of cells for electric storage batteries in which two or more adjoining cells are formed together or in one piece, the cavities of adjoining cells being separated by a partition. In such duplicate or multiple cells the moisture is liable to leak or creep from one cell to the other along the under side of the cover or covers and over the top of the partition. When this occurs, a connection is established between the cells by this film of moisture and a current passes from one cell to the other, whereby the cells are discharged to a greater or less extent.

My invention has the object to prevent moisture from passing over the partition between the cells.

Figure 1:
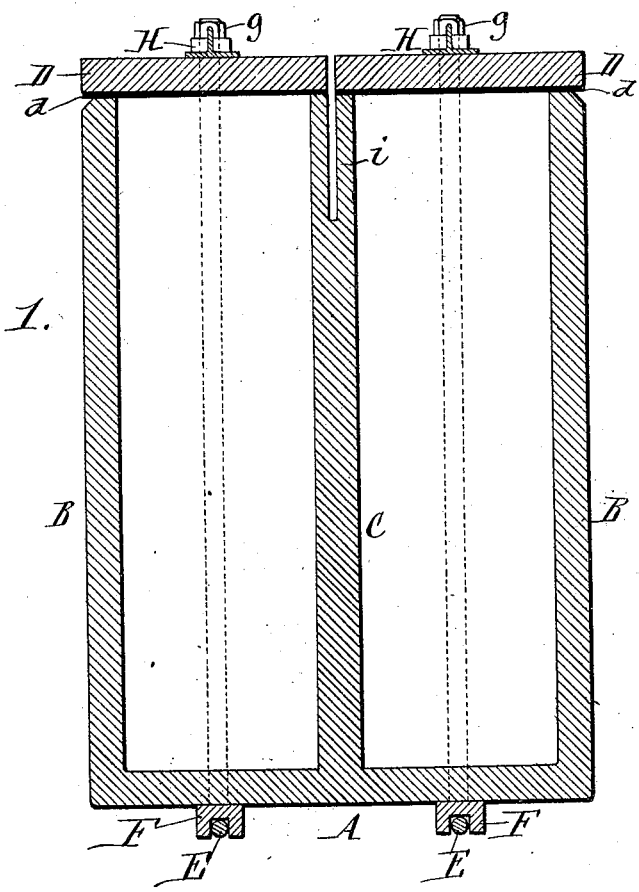
Figure 2:
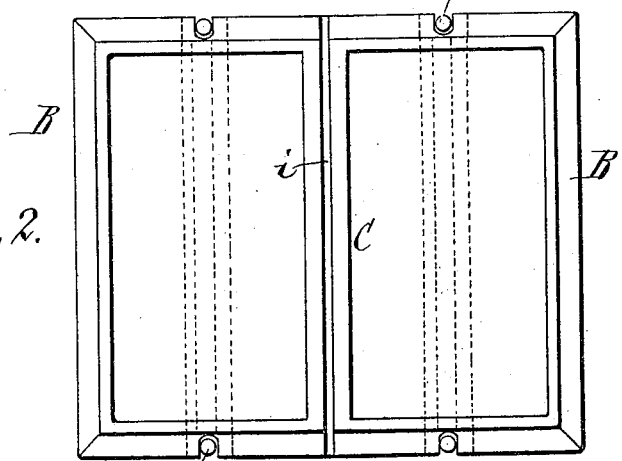

In the accompanying drawings, Figure 1 is a vertical section of a duplex cell provided with my improvement. Fig. 2 is a top plan view of the same with the covers removed.

Like letters of reference refer to like parts in both figures.

A represents the bottom, B the upright outer walls, C the partition, and D the covers, of a duplex cell or two adjoining cells formed in one piece. The bottom, outer walls, and partition are formed of earthenware or other suitable material, and the covers are preferably formed of wood and provided on their under sides with a packing $d$, consisting of sheet-rubber. The covers are secured to the bodies of the cells by any suitable or well-known means. As shown in the drawings, they are secured as follows: E represents bails arranged with their lower horizontal portions in grooved or channeled cross-bars F, arranged under the bottom of the cells. These bails extend with their upright parts or legs on both sides of the cells upwardly beyond the covers and connect at their upper ends by means of screw-nuts $g$ with cross-bars H, which are placed upon the covers, so that by tightening these screw-nuts the covers and their packing-sheets are tightly drawn against the open upper ends of the cells.

$i$ represents a groove, depression, or channel formed in the top of the partition, lengthwise of the latter. This groove intercepts any moisture which may leak past the packing under the cover of either cell and compels such moisture to descend into the groove before it can pass over the partition into the adjoining cell. The groove is made of such depth and width that the moisture which may reach the groove by leakage will evaporate before the walls of the groove become so coated with moisture that a connection is established between the cells. The groove thus forms a trap which intercepts leakage, allows the same to evaporate, and so prevents the same from connecting the cells.

I claim as my invention—

A duplex or multiple cell having the partition which separates adjoining cells provided in its top with a depression, forming a trap for intercepting moisture, substantially as set forth.

Witness my hand this 24th day of July, 1899.

RUFUS N. CHAMBERLAIN.

Witnesses:
JNO. J. BONNER,
ELLA R. DEAN.